(12) United States Patent
Cai et al.

(10) Patent No.: US 10,467,466 B1
(45) Date of Patent: Nov. 5, 2019

(54) LAYOUT ANALYSIS ON IMAGE

(71) Applicant: NEXTVPU (SHANGHAI) CO., LTD., Shanghai (CN)

(72) Inventors: Haijiao Cai, Shanghai (CN); Xinpeng Feng, Shanghai (CN); Ji Zhou, Shanghai (CN)

(73) Assignee: NEXTVPU (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/457,698

(22) Filed: Jun. 28, 2019

(30) Foreign Application Priority Data

May 17, 2019 (CN) .......................... 2019 1 0408950

(51) Int. Cl.
*G06K 9/00* (2006.01)
*G10L 13/08* (2013.01)
*G06F 3/16* (2006.01)

(52) U.S. Cl.
CPC ........... *G06K 9/00463* (2013.01); *G06F 3/16* (2013.01); *G10L 13/08* (2013.01); *G06K 2209/01* (2013.01)

(58) Field of Classification Search
None
See application file for complete search history.

(56) References Cited

U.S. PATENT DOCUMENTS

| | | | | |
|---|---|---|---|---|
| 7,668,718 B2* | 2/2010 | Kahn | ..................... | G10L 15/063 704/270 |
| 9,911,361 B2* | 3/2018 | Wexler | ...................... | A61F 9/08 |
| 2002/0051575 A1* | 5/2002 | Myers | ................... | G06K 9/3258 382/202 |
| 2003/0152277 A1* | 8/2003 | Hall, Jr. | .............. | G06K 9/00463 382/229 |
| 2005/0102139 A1* | 5/2005 | Fukada | ................. | G06K 9/6293 704/235 |
| 2006/0007481 A1* | 1/2006 | Kato | ................... | H04N 1/00209 358/1.15 |
| 2006/0092480 A1* | 5/2006 | Cui | ....................... | G06K 9/2054 358/474 |
| 2006/0177135 A1* | 8/2006 | Fujita | ................... | G06K 9/2054 382/187 |
| 2006/0294453 A1* | 12/2006 | Hirata | ...................... | G10L 15/26 715/203 |

(Continued)

FOREIGN PATENT DOCUMENTS

| CN | 102890826 A | 1/2013 |
|---|---|---|
| CN | 106484669 A | 3/2017 |

(Continued)

*Primary Examiner* — Shervin K Nakhjavan
(74) *Attorney, Agent, or Firm* — Seed IP Law Group LLP

(57) ABSTRACT

The present application relates to layout analysis on an image. The layout analysis method comprises: obtaining coordinate information of one or more character lines in an image; generating a layout model corresponding to the image by setting character data in regions in a data structure that correspond to the coordinate information of the one or more character lines, the character data including data indicating the presence of character; scanning the generated layout model to read the character data from the layout model, and performing paragraph division on the layout model based on a relative positional relationship of the read character data in the layout model.

20 Claims, 10 Drawing Sheets

(56) References Cited

U.S. PATENT DOCUMENTS

| | | | |
|---|---|---|---|
| 2007/0124142 A1* | 5/2007 | Mukherjee | G10L 13/10 704/235 |
| 2007/0185704 A1* | 8/2007 | Yoshimura | G10L 17/26 704/10 |
| 2007/0292026 A1* | 12/2007 | Reznik | G06K 9/036 382/176 |
| 2009/0238625 A1 | 9/2009 | Ming et al. | |
| 2009/0313245 A1* | 12/2009 | Weyl | G06K 9/00463 |
| 2010/0074471 A1* | 3/2010 | Kurzweil | G06F 3/017 382/103 |
| 2012/0215540 A1* | 8/2012 | Goktekin | H04L 51/066 704/260 |
| 2015/0161474 A1* | 6/2015 | Jaber | G06K 9/52 382/203 |
| 2017/0364746 A1* | 12/2017 | King | G06F 16/5846 |

FOREIGN PATENT DOCUMENTS

| | | |
|---|---|---|
| CN | 106951400 A | 7/2017 |
| CN | 103577818 B | 9/2018 |
| CN | 109697414 A | 4/2019 |
| CN | 106250830 B | 5/2019 |
| KR | 10-0576370 B1 | 5/2006 |

* cited by examiner

TL1 — To you your father should be as a god, one that composed your

TL2 — A Midsummer Night's Dream

TL3 — beauties and one to whom you are but as a form in wax. By him

TL4 — imprinted or within his power to leave the figure or not.

TL5 — The dove pursues the griffin, and the mild hind makes speed to

TL6 — catch the tiger.

LAYOUT ANALYSIS ON IMAGE

CROSS REFERENCE TO RELATED APPLICATION

The present application claims priority to and is entitled to the benefit of Chinese Patent Application No. 201910408950.0, filed May 17, 2019, the entire content of which is incorporated herein by reference for various purposes.

BACKGROUND

Technical Field

The present disclosure relates to the field of data processing, and in particular to a layout analysis method, a reading assisting device and a non-transitory computer readable storage medium.

Description of the Related Art

Layout analysis techniques analyze an image, for example, by dividing characters in an image into a plurality of paragraphs, and using the obtained paragraphs for subsequent processing. Layout technique may be applied to the generation of e-books, generation of audio books, etc. The layout analysis technique mainly relies on image data of the character or semantic information thereof, and divides the characters in the image into a plurality of paragraphs by means of techniques such as image processing, a clustering algorithm or a semantic analysis algorithm. Such techniques are usually algorithmically complex and computationally heavy.

The descriptions about the layout analysis techniques in this section are not necessarily the methods that have been previously conceived or employed. Unless otherwise expressly indicated, it should not be assumed that any of the methods described in this section are considered to be the prior art just because they are included in this section. Similarly, the problems mentioned in this section should not be considered to be universally recognized in any prior art, unless otherwise indicated expressly.

BRIEF SUMMARY

According to an aspect of the present disclosure, a computer-implemented layout analysis method is provided, comprising: obtaining coordinate information of one or more text character lines in an image containing a text content; generating a layout model corresponding to the image by setting character data in regions in a data structure, the regions corresponding to the coordinate information of the one or more text character lines, the character data including data indicating presence of a text character; scanning the generated layout model to obtain the character data from the layout model; performing paragraph division on the layout model based on a relative positional relationship among the obtained character data in the layout model; performing text character recognition on the image to obtain text characters; and converting the text characters in each paragraph into sound data according to a result of paragraph division.

According to another aspect of the present disclosure, a reading assisting device is provided, including: a sensor configured to acquire an image; and an integrated circuit, the integrated circuit including: a circuit configured to execute the steps of the method according to the present disclosure, the chip circuit further includes a circuit configured to perform character recognition on the image to obtain text characters, and a circuit configured to convert the text characters in each paragraph into sound data according to a result of paragraph division. The reading assisting device further includes a sound output device configured to output the sound data.

According to another aspect of the present disclosure, a non-transitory computer readable storage medium storing a program is provided, the program including instructions that, when executed by a processor of an electronic device, cause the electronic device to execute the method according to the present disclosure.

More features and advantages of the present disclosure will become apparent from the exemplary embodiments described below with reference to the accompanying drawings.

BRIEF DESCRIPTION OF THE DRAWINGS

The accompanying drawings exemplarily show the embodiments and constitute a part of the Description for interpreting the exemplary implementations of the embodiments together with the character description of the Description. The embodiments shown are merely for illustrative purposes and do not limit the scope of the claims. In all the figures, the same reference signs refer to similar but not necessarily identical elements.

FIG. 2 is a schematic diagram showing an example of an image including character lines and a corresponding layout model thereof according to an exemplary embodiment of the present disclosure;

DETAILED DESCRIPTION

Figure 1:
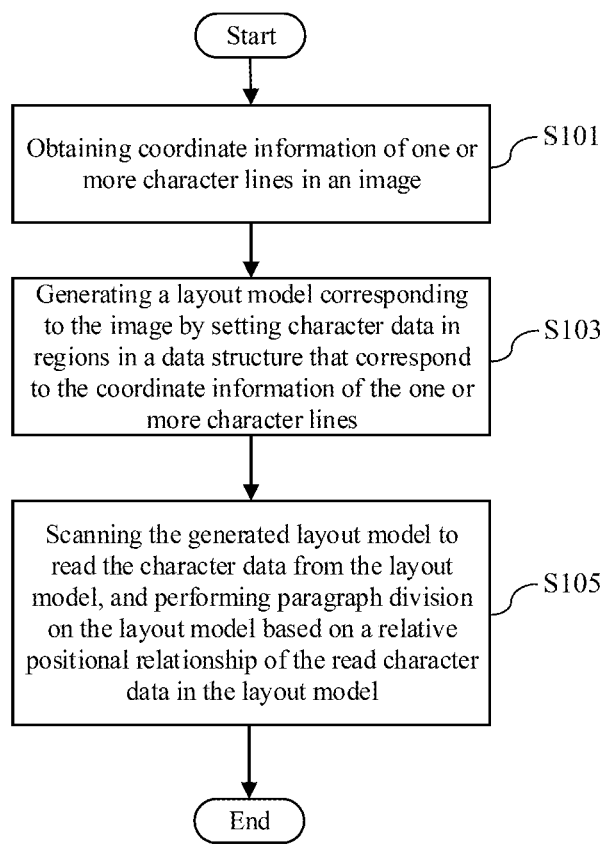
FIG. 1 is a flow chart showing a layout analysis method according to an exemplary embodiment of the present disclosure.

In the present disclosure, unless otherwise stated, the terms "first", "second", etc., used to describe various elements are not intended to limit the positional, temporal or importance relationship of these elements, but rather only to distinguish one component from the other. In some examples, the first element and the second element may point to the same instance of the elements, and in some cases, based on contextual descriptions, they may also refer to different instances.

The terms used in the description of the various examples in the present disclosure are merely for the purpose of describing particular examples, and are not intended to be limiting. Unless the context clearly indicates otherwise, if the number of elements is not specifically defined, the elements may be one or more. Moreover, the term "and/or" used in the present disclosure encompasses any of and all possible combinations of listed items.

In the present disclosure, for an image, "horizontal" refers to a direction of an image side that is substantially parallel to a character line (e.g., with an angle less than 45 degrees), and "vertical" refers to a direction of another image side that is vertical to "horizontal". For a layout model, "horizontal" refers to the line direction of a data structure of the layout model, which corresponds to the "horizontal" of the image, and "vertical" refers to the column direction of the data structure of the layout model, which corresponds to the "vertical" of the image.

The following description of the present disclosure is mainly based on the case where character lines extend in a substantially left-right direction (i.e., a horizontal reading material) with respect to a reader, but the technical solution of the present disclosure is not limited thereto. The technical solution of the present disclosure is also applicable to the case where character lines extend in a substantially up-down direction (i.e., a vertical reading material) with respect to the reader, i.e., the algorithm of the present disclosure is also applicable to the case of vertical reading materials. In the case where character lines extend in a substantially up-down direction, the horizontal direction in the present disclosure may mean substantially the up and down direction, and the vertical direction may mean substantially the left and right direction. In other words, the terms "horizontal", "vertical" and the like in the present disclosure do not have absolute meanings, as long as they are two directions vertical to each other instead. In the case where character lines are in substantially the up and down direction, the "up and down" and "left and right" directions in the present disclosure may be interchanged.

Reading materials such as books or magazines usually have certain typesetting. For example, the content of a reading material is divided into different paragraphs (e.g., upper and lower paragraphs, left and right columns, etc.). When reading these reading materials, one visually captures an image in the field of vision, identifies paragraphs in the image through the brain, and reads the character in the paragraphs. However, if a machine "reads" these reading materials, character recognition is not only required for the character in the image, but also paragraph division is required for the character by a certain algorithm, so that the machine can "read" the character in the reading material in a correct paragraph order. For example, such a paragraph division technique may be used in an application that a paper book is converted into an electronic book, or in an application that character in an image is converted into sound signals and the sound signals are output. In the present disclosure, "paragraph division" refers to dividing character in an image or character data in a layout model into different paragraphs. The up-down paragraph division may also be referred to as paragraphing, and the left-right paragraph division may also be referred to as column division.

The present disclosure provides a paragraph division method, which avoids complicated direct image processing or semantic analysis of a character image, but converts an image containing characters into a layout model that simulates the character distribution in the image but is simpler in structure, wherein the data included in the layout model may include, for example, no semantic content but only simple data indicating where the character is present, and then position analysis is performed on the data in the layout model for paragraph division. The exemplary embodiments of the layout analysis method of the present disclosure will be further described below with reference to the accompanying drawings.

FIG. 1 is a flow chart showing a layout analysis method according to an exemplary embodiment of the present disclosure. As shown in FIG. 1, the layout analysis method may include, for example, the following steps executed by a processor: obtaining coordinate information of character lines (step S101), generating a layout model (step S103), and scanning the layout model for paragraph division (step S105).

In step S101, coordinate information of one or more character lines is obtained from an image.

Because coordinate information of character instead of an original image of the character is mainly used in the exemplary method of the present disclosure for layout analysis, in this step, coordinate information of character lines is obtained from an image for use in subsequent processing.

The image may be electronic image data acquired by an image sensor. According to some embodiments, the image sensor may be disposed on an item, such as a wearable device or glasses, of a user, such that the image may be an image, photographed by the image sensor, of a layout of a reading material (e.g., a book or a magazine, etc.) held by the user. The image may contain the content, such as characters (which may include text, numbers, characters, symbols, punctuations, etc., of various countries and regions), and pictures. According to some embodiments, the image may be a preprocessed image, wherein the preprocessing may include, but is not limited to, tilt correction, blur removal, etc. According to some embodiments, the image may be stored in a non-transitory storage device or a storage medium after being acquired by the image sensor, and read out for processing.

The character line refers to a continuous line of characters, which may be, for example, a sequence of characters having a spacing between adjacent characters less than a threshold spacing in the horizontal direction. The spacing between adjacent characters may be, for example, a distance between equi-coordinates of adjacent characters, e.g., a distance between coordinates of the upper left corner, the lower right corner, or the centroids of adjacent characters in a character line direction. According to some embodiments, if the spacing between adjacent characters is not greater than the threshold spacing, the adjacent characters may be considered to be continuous and then divided into the same character line; and if the spacing between adjacent characters is greater than the threshold spacing, the adjacent characters may be considered to be discontinuous (e.g., may be respectively belong to the left and right column), and then divided into different character lines.

According to some embodiments, the coordinate information of one character line may be coordinate information of a rectangle containing the character line (e.g., a minimum rectangle containing the character line, or a rectangle obtained by expanding the minimum rectangle containing the character line upwards, and/or downwards, and/or leftwards, and/or rightwards by a certain multiple). The coordinate information of a character line may include, for example, coordinate information of four vertexes of the rectangle, and may also include coordinate information of any of vertexes of the rectangle and height information and length information of the rectangle. However, the definition of the coordinate information of a character line is not limited thereto, as long as it can represent the position and size of a space occupied by the character line.

According to some embodiments, the coordinate information of the character line may be obtained, for example, from the other machine (e.g., a remote server or a cloud computing device) or the other application (e.g., an application for character recognition, such as optical character recognition (OCR)), but may also be obtained by means of character recognition processing in a local application.

FIG. 2 is a schematic diagram showing an example of an image including character lines and a corresponding layout model thereof according to an exemplary embodiment of the present disclosure, wherein character lines TL1 to TL6 in an image 201 are shown, and rectangles containing the character lines in the image 201 are shown by dashed boxes.

In step S103, a layout model corresponding to the image is generated by setting character data in regions in a data structure that correspond to coordinate information of the one or more character lines.

In this step, a layout model for simulating the character distribution in the image is constructed by setting "character data" which is simpler than the character image itself in regions that correspond to the character lines obtained in the previous step, for use in subsequent processing.

The layout model as stated in the present disclosure is a model constructed to simulate the position distribution of character lines in an image, in which the data at each position constitutes a corresponding and mapping relationship with pixels at the corresponding position in the image. The layout model is constructed by setting, in the position of the data structure, data indicating the presence of character at the corresponding position in the image.

According to some embodiments, the data structure may be a file in a memory (e.g., a memory, a cache, etc.), or an image expressed in pixels, or a table or a data array. The data structure is not limited to any particular data structure, as long as the data therein can simulate the character lines in the image. The data structure may have the same size as that of the image, or have a size scaled relative to the size of the image. For example, if the image has a pixel size of 3840×2160, the data structure (and the corresponding layout model) may have the same size as the image (i.e., having 3840×2160 pixels or data), and may be scaled only in a horizontal direction (e.g., having 1920×2160 pixels or data), scaled only in a vertical direction (e.g., having 3840×1080 pixels or data), scaled in both horizontal and vertical directions (e.g., having 1920×1080 pixels or data, or having 1280×1080 pixels or data), and so on. Regardless of the case of the data structure having the same size as that of the image or having a size proportionally scaled relative to the size of the image, a corresponding or mapping relationship can be established between the data or pixels of the data structure and the pixels of the image according to the positions of the regions in the image.

According to some embodiments, the character data includes data representing the presence of character, which may indicate whether character is present in a region that corresponds to the coordinate information of the character, regardless of the semantics or content of the character. Moreover, blank data may be set in a region in the data structure that corresponds to a non-character region of the image, the blank data being data representing the absence of character. According to some embodiments, the character data may be, for example, "1", and the blank data may be, for example, "0". However, the character data is not limited to "0" and "1", and may also be any other data as long as it can be distinguished whether character or character lines exist in the region.

According to some embodiments, in the case where the size of the layout model is scaled relative to the size of the image, the coordinates of the regions in the data structure of the layout model that correspond to the coordinate information of the character lines may also be proportionally scaled relative to the coordinates of a character line region of the image. In the case where the size of the data structure of the layout model is less than the size of the image, a plurality of pixels in the image are mapped to one piece of data or pixel in the layout model according to a mapping rule. If the plurality of pixels in the image include both pixels in a character line and pixels in a blank region, the mapping rule may be specified, for example, that the plurality of pixels are mapped to character data, or that the plurality of pixels are mapped to blank data. As an alternative, the mapping rule may include, for example: if the ratio of the number of pixels, in a character line, in a plurality of pixels of the image to the number of pixels in a blank region is not less than a predetermined ratio, mapping the plurality of pixels to character data, otherwise, mapping the same to blank data. As an alternative, the mapping rule may also include, for example: if N pixel lines are mapped to one data or pixel line in the layout model, extracting one pixel line per N pixel lines and mapping the same to one data or pixel line in the layout model.

Figure 5:
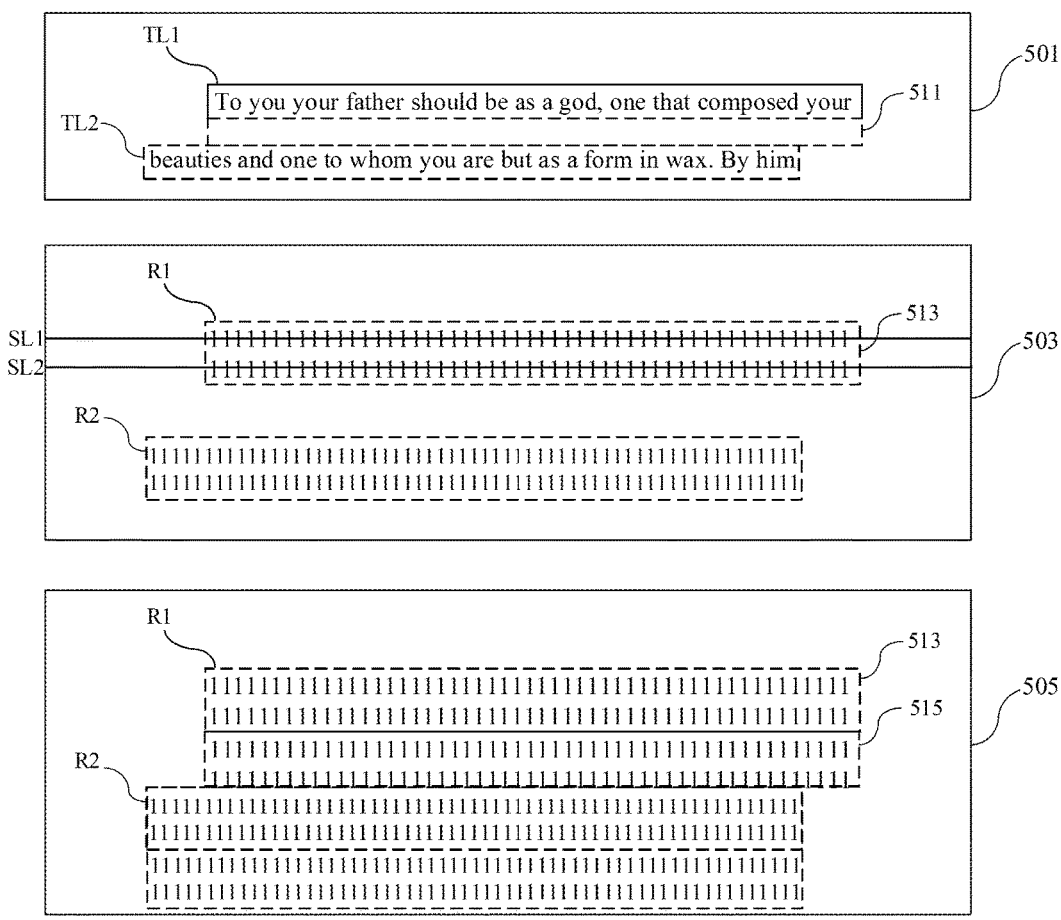
FIG. 5 is a schematic diagram showing an example of regions in a data structure of the layout model that correspond to the coordinate information of character lines according to an exemplary embodiment of the present disclosure.

The example shown in FIG. 2 shows a layout model 203 corresponding to the image 201. It may be seen that character data ("1" in this example) is set in regions R1 to R6 corresponding to the character lines TL1 to TL6 in the layout model 203, while blank data ("0" in this example) is set in other blank regions. It may be seen that the positional distribution of the character data in the layout model 203 nicely simulates the positional distribution of the character lines in the image 201. In the layout model 203, a scaling ratio relative to the image 201 enables one data line (pixel line) in the data structure of the layout model 203 to correspond exactly to one character line in the image 201. It should be appreciated, however, that in many embodiments, if other scaling ratios are employed or scaling is not performed at all, one character line in the image 201 may be represented by a plurality of data lines (pixel lines) in the layout model 203. For example, FIG. 5 shows an example in which one character line in an image 501 is represented by two data lines (pixel lines) in a layout model 503. As another example, if the height of character in the image 201 is, for example, 10 pixels, one character line may also be represented by 5 or 10 data lines (pixel lines) in the data structure of the layout model 203.

In step S105, the generated layout model is scanned to read the character data from the layout model, and paragraph division is performed on the layout model based on a relative positional relationship of the read character data in the layout model.

In this step, paragraph division is performed on the character data in the layout model by scanning and reading the data in the layout model obtained in the previous step.

According to some embodiments, the scanning may refer to data-by-data or pixel-by-pixel scanning and reading of the data structure of the layout model. For example, when the layout model is another image or data array corresponding to the image, the scanning may refer to, for example, line-by-line scanning of the another image or data array. One scan line may be, for example, one data line or pixel line that runs through the layout model in a horizontal direction. One character line may correspond to a plurality of scan lines, as shown by two scan lines SL1 and SL2 corresponding to the character line TL1 in FIG. 5. One scan line may also involve a plurality of different character lines that are separated in a horizontal direction, i.e., may contain a plurality of character data sequences. In the example of FIG. 2, the scan line SL in the layout model 203 involves the character lines TL1 and TL2, that is, containing the corresponding character data sequences in the regions R1 and R2. Here, a character data sequence refers to a sequence of continuous characters data (i.e., there is no blank data between character data), or a sequence of character data having an amount of blank data between adjacent character data to be less than a threshold value, wherein the threshold value may be, for example, several character data, such as 3 or 5 character data. When the character data is represented by "1", a typical character data sequence may be, for example, a continuous string of "1", as shown in FIGS. 2 and 5.

By means of the scanning, the values of the character data (and the blank data) can be read from the generated layout model, and a relative positional relationship thereof can be analyzed, such that paragraph division is performed on the layout model based on the relative positional relationship.

According to the method shown in FIG. 1, since a layout model containing simple data indicating whether a character line exists in a region is generated based on an image containing characters (character lines), that is, simulating the original image using a layout model containing simpler information, the layout analysis problem is transformed from a complex image processing problem into a relatively simple position analysis problem, allowing significant reduction in the algorithm complexity and the calculation amount while substantially maintaining the precision of layout analysis, and reduction in the computational load when a computer analyzes the layout problem. Moreover, when the size of the layout model is reduced relative to the size of the image, the amount of data to be processed can be further reduced, thereby further reducing the computational load when the computer analyzes the layout problem.

Figure 3:
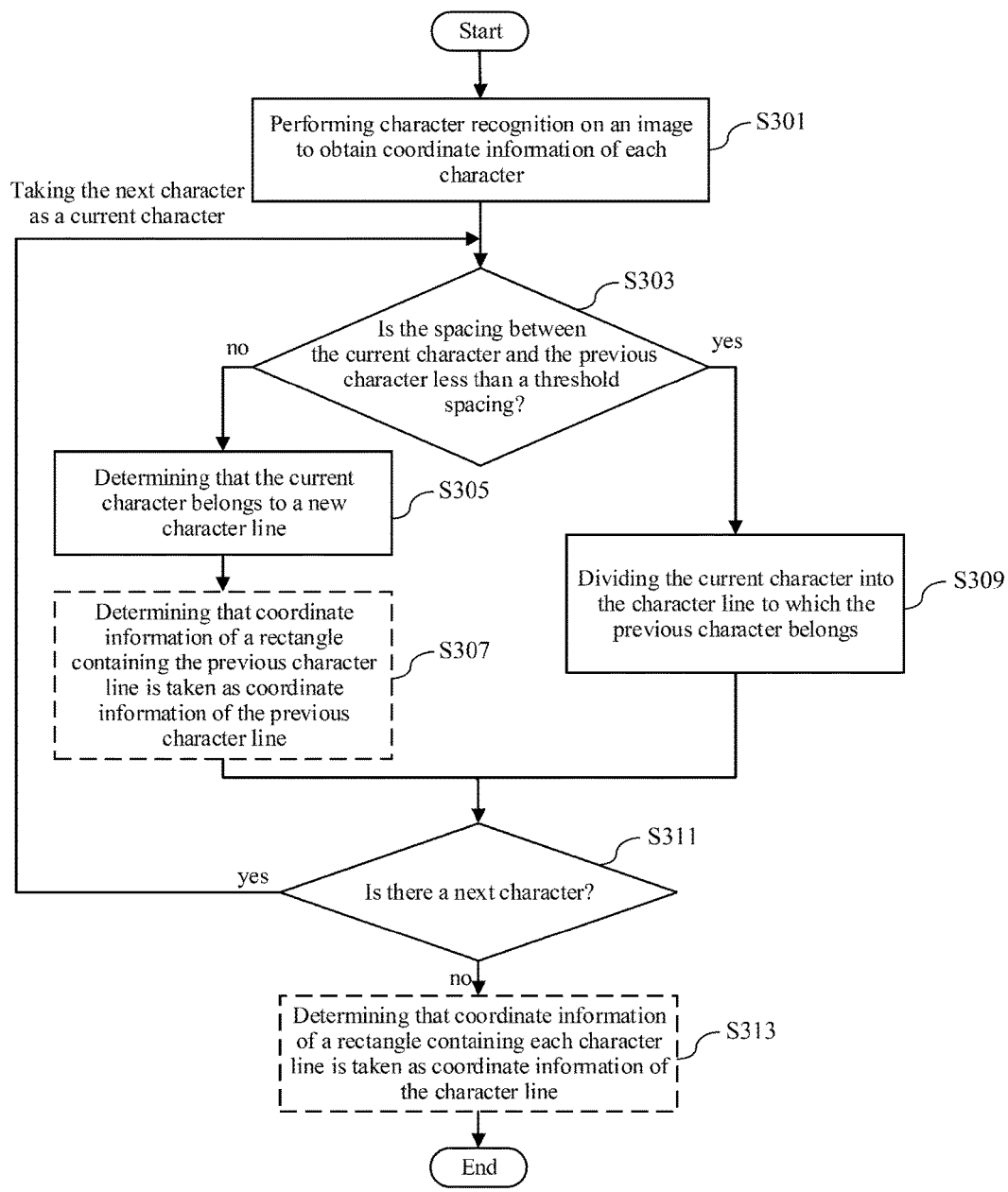
FIG. 3 is a flow chart showing an exemplary method for obtaining coordinate information of character lines according to an exemplary embodiment of the present disclosure.
Figure 4:
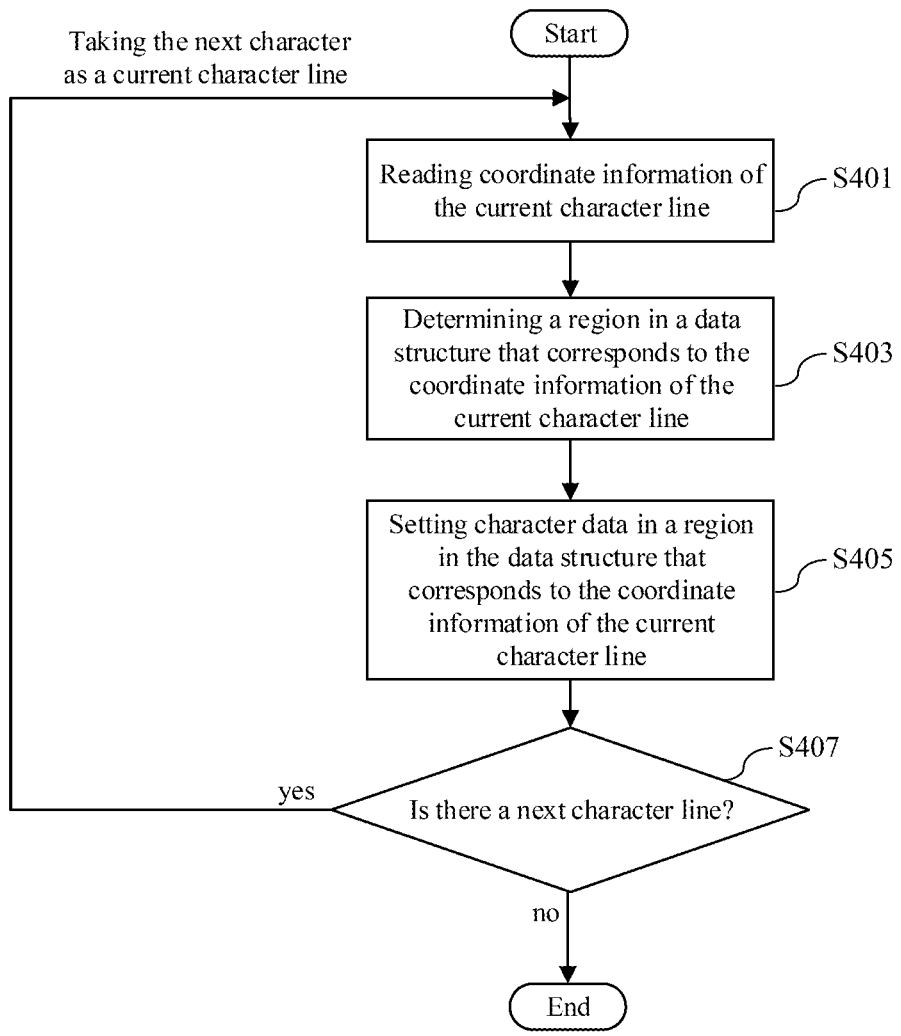
FIG. 4 is a flow chart showing an exemplary method for generating a layout model according to an exemplary embodiment of the present disclosure.
Figure 6:
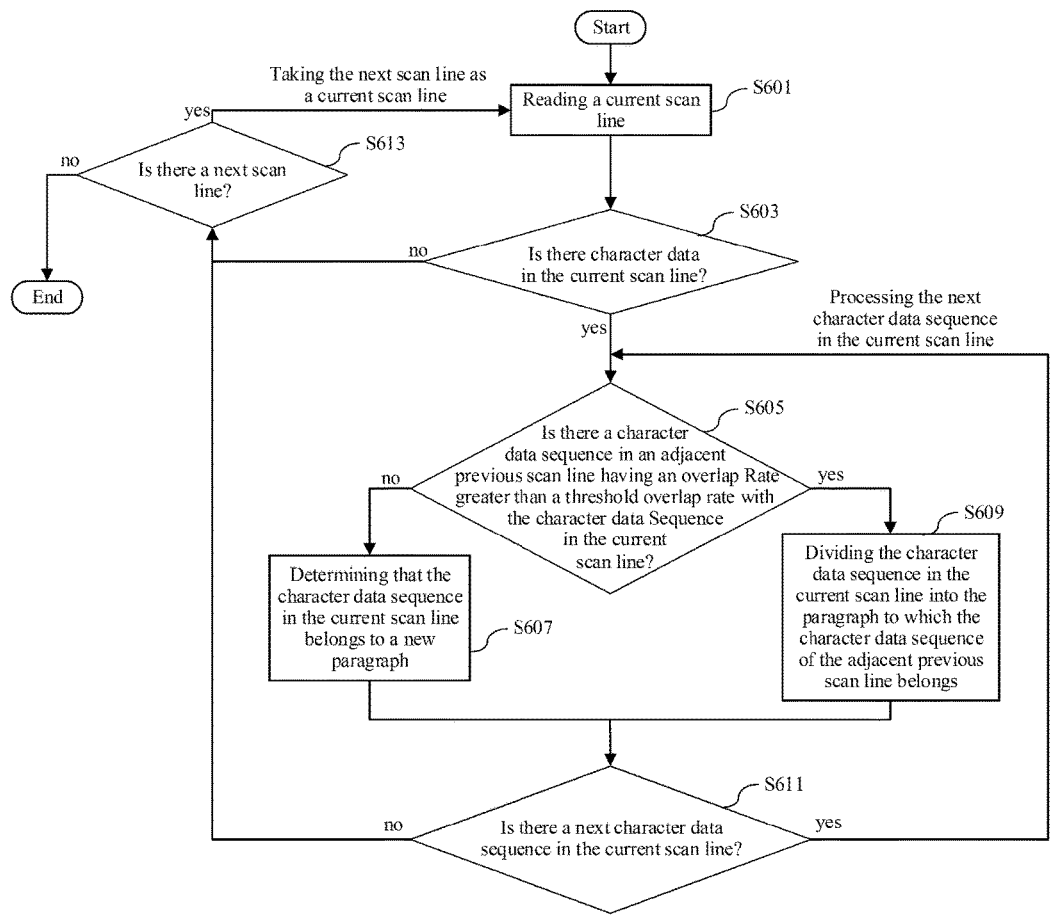
FIG. 6 is a flow chart showing an exemplary method for scanning the layout model to perform paragraph division according to an exemplary embodiment of the present disclosure.

The layout analysis method of the present disclosure has been described above with reference to FIGS. 1 and 2. The exemplary implementations of steps S101, S103 and S105 and the other embodiments will be further described below in detail with reference to FIGS. 3 to 10, wherein FIG. 3 shows an exemplary embodiment of processing of obtaining character lines in step S101, FIG. 4 shows an exemplary embodiment of processing of generating a layout model in step S103, and FIG. 6 shows an exemplary embodiment of processing of scanning the layout model to perform paragraph division in step S105. It should be noted that various definitions, embodiments, implementations, examples and the like described above with reference to FIGS. 1 and 2 may also be applied to or combined with the exemplary embodiments described later.

FIG. 3 is a flow chart showing an exemplary method for obtaining coordinate information of character lines according to an exemplary embodiment of the present disclosure, which may be used as an exemplary implementation of step S101, i.e., step S101 may include the steps of the flow chart in FIG. 3.

In step S301, character recognition is performed on an image to obtain coordinate information of each character. Various character recognition techniques such as optical character recognition (OCR) technique in the related art may be used in this step. The coordinate information of a character may include, for example, but is not limited to, coordinates of four vertexes of a rectangle containing the character and/or width and height information of the character, etc. Coordinate of a character in any related art may be used as the coordinate information here as long as it can embody the position of the character in an image and the occupied region thereof.

In each of steps subsequent to step S301, each character is sequentially processed based on the coordinate information of the character from the first character in the image so as to obtain a character line.

In step S303, it is determined whether the spacing between the currently processed character and the previous character is less than a threshold spacing. If it is not less than the threshold spacing ("NO" in step S303), it is determined that the current character belongs to a new character line (step S305); otherwise ("YES" in step S303), the current character is divided into the character line to which the previous character belongs (step S309).

According to some embodiments, the threshold spacing may be, for example, determined according to application requirements (e.g., language, character type, etc.), which, for example, may be set to a specific multiple of (e.g., 1.2 to 3.5 times) the average character width, or set to a specific multiple of (e.g., 1.5 to 3.5 times) a predetermined average spacing between adjacent characters in the same paragraph. However, the method of determining the threshold spacing is not limited thereto, as long as it can be used to distinguish whether adjacent characters belong to the same paragraph.

In the example of FIG. 2, the threshold spacing is set, for example, to 2.5 times the average character width. Since the spacing between adjacent characters "e" and "a" in "be" and "as" in the character line TL1 is less than the threshold spacing, they are divided into the same character line TL1. However, since the spacing between "r" in "your" at the end of the character line TL1 and "A" at the beginning of the character line TL2 is greater than the threshold spacing, they are respectively divided into different character lines TL1 and TL2.

After the current character is divided into the previous character line or a new character line, it is determined, in step S311, whether there is a next character in the image, and if there is a next character ("YES" in step S311), the next character is taken as the current character, and character line division on it is continued by the processing from step S303; and if there is no next character ("NO" in step S311), it means that all the characters in the image have been divided into the character lines.

According to some embodiments, after it is determined, in step S305, that the current character belongs to a new character line, that is, the previous character is the last character in the previous character line, thus, for example, the coordinate information of a rectangle containing the previous character line may be used as coordinate information of the previous character line in step S307. According to some other embodiments, step S307 may not be executed, instead, the coordinate information of a rectangle containing a character line is determined to be as the coordinate information of the character line with respect to each character line in step S313 after all the characters in the image are divided into the corresponding character lines in steps S305, S309 and S311. According to some embodiments, the sides of the rectangle are respectively parallel to the sides of the image, i.e., having a horizontal direction and a vertical direction.

Such a technique exists in a character recognition algorithm (e.g., an optical character recognition (OCR) algorithm) in the related art, which is capable of recognizing each character in an image to obtain coordinate information of the character, and is also capable of determining a rectangle containing a character line and coordinate information thereof. The related art regarding various character recognition algorithms may be applied herein. Therefore, the technique of the present disclosure can make full use of the results that can be obtained by means of the character recognition algorithm in the related art, thereby improving the algorithm efficiency.

In some cases, the character line in the image has a certain inclination relative to a horizontal side (parallel to the horizontal side of the image) of the rectangle containing the character line. When the inclination is less than a threshold inclination (e.g., 20 or 30 degrees), no substantial influence is produced on the result of paragraph division. When the inclination is greater than or equal to the threshold inclination, the image may be preprocessed to correct the inclination of the character, and the steps in FIG. 3 and the subsequent processing are performed based on the inclination-corrected image. According to the other embodiments, when the inclination is greater than or equal to the threshold inclination, a user may also be prompted to improve the posture of holding a reading material to reduce the inclination of the image.

FIG. 4 is a flow chart showing an exemplary method for generating a layout model according to an exemplary embodiment of the present disclosure, which may be used as an exemplary implementation of step S103, i.e., step S103 may include the steps of the flow chart in FIG. 4.

For example, after the coordinate information of the character lines is obtained according to step S101 or the flow chart in FIG. 3, the obtained character lines are processed one by one from the first character line in the image.

In step S401, the coordinate information of a current character line is read. In step S403, a region that corresponds to the coordinate information of the current character line is determined. In step S405, character data is set in the region in a data structure that corresponds to the coordinate information of the current character line. In step S407, it is determined whether there is still a next character line, and if there is still a next character line ("YES" in step S407), the next character line is used as the current character line, and character line division on it is continued by the processing from step S401; and if there is no next character line ("No" in step S407), it means that all the character lines in the image have been modeled into the layout model.

According to some embodiments, the regions in a data structure that correspond to the coordinate information of one or more character lines may include a region determined from the coordinate information of each character line in the data structure. In the case where coordinate information of one character line in an image is the coordinate information of a certain rectangle, setting character data in a region in the data structure that corresponds to coordinate information of each character line means setting character data in a data region or a pixel region in a rectangle at the corresponding position in the layout model. In the example of FIG. 2, character data "1" is set in the regions R1 to R6 determined based on the coordinate information of the character lines TL1 to TL6 to form the layout model 203 of the image 201.

According to some embodiments, the regions that correspond to the coordinate information of one or more character lines include both a region determined from the coordinate information of each character line and a region obtained by extending (e.g., upwards and/or downwards) the coordinate information of the character line by a specific distance in a vertical direction. In other words, before step S403, a step of extending (e.g., upwards and/or downwards) the coordinate information of the character line by a specific distance in the vertical direction may be further included. According to some embodiments, the specific distance depends on a line spacing between adjacent character lines in a direction vertical to the character line in the image (i.e., the height of the blank between a upper character line and an adjacent lower character line). If extended upwards only or downwards only, the specific distance may cover, for example, all of the blanks between the upper and lower character lines in the same paragraph, and the specific distance may be, for example, 1 to 1.5 times the average line spacing between adjacent character lines in the image. If simultaneously extended upwards and downwards, the specific distance may cover, for example, part of the blanks between the upper and lower character lines in the same paragraph, and the specific distance may be, for example, 0.5 to 0.7 times the average line spacing between adjacent character lines in the image, so that the upper and lower character lines are both extended to jointly cover the blank therebetween.

FIG. 5 is a schematic diagram showing an example of regions in a data structure of the layout model that correspond to the coordinate information of character lines according to an exemplary embodiment of the present disclosure. In the example shown in FIGS. 5, TL1 and TL2 are two character lines in an image 501. According to some embodiments, a region R1 corresponding to the coordinate information of the character line TL1 in a data structure of a layout model 503 includes a region 513 determined from the coordinate information of the character line TL1 in the data structure, which is similar for the character line TL2 and a region R2. According to some other embodiments, the region R1 corresponding to the coordinate information of the character line TL1 in the data structure of the layout model 503 includes not only a region 513 determined from the coordinate information of the character line TL1 in the data structure, but also includes a region 515 obtained by extending coordinate information of the character line TL1 downwards by two pixel lines, which is similar for the character line TL2 and the region R2.

It may be seen that, by the extension, if the upper and lower character lines are in the same paragraph, the regions in the data structure of the layout model that correspond to the coordinate information of the character lines may cover not only the character lines themselves but also the interlined blanks therebetween, so that in the layout model, there is no blank data between the corresponding character data of the upper and lower adjacent character lines in the same paragraph and they are well integrated, which facilitates simplifying the subsequent scan processing algorithm. However, such extension is not necessary, and it is also possible to process the blank data between the upper and lower adjacent character lines in the same paragraph in the subsequent scan processing algorithm.

FIG. 6 is a flow chart showing an exemplary method for scanning a layout model to perform paragraph division according to an exemplary embodiment of the present disclosure, which may be used as an exemplary implementation of step S105, i.e., step S105 may include the steps illustrated in the flow chart in FIG. 6.

Figure 7:
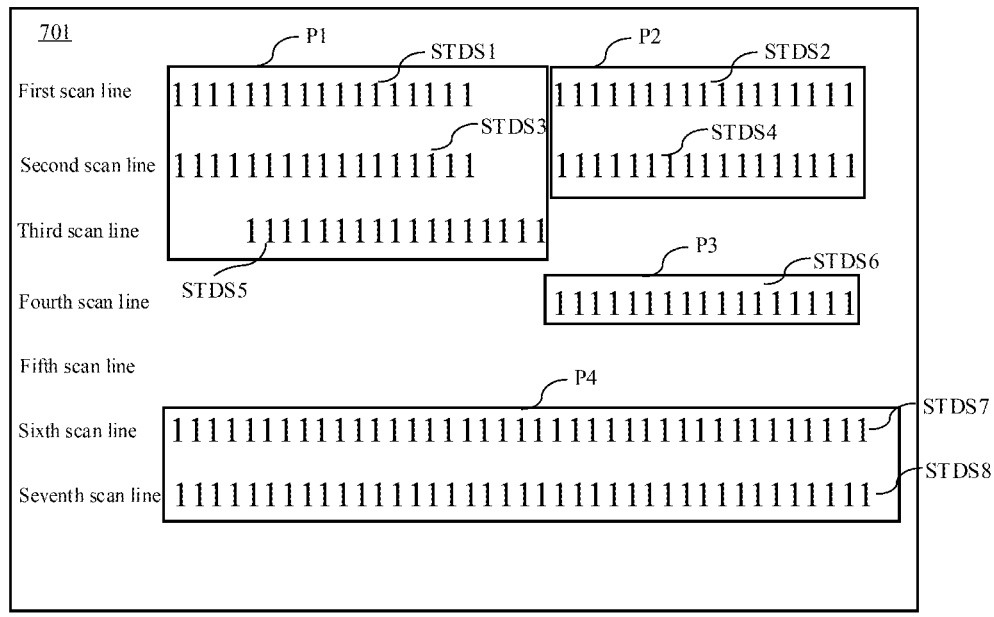
FIG. 7 is a schematic diagram showing an example for illustrating an exemplary layout model for paragraph division according to an exemplary embodiment of the present disclosure.

According to FIG. 6, the data or pixels in the layout model are scanned line by line after the layout model is generated, for example, according to step S103 or the flow chart in FIG. 4. The process of FIG. 6 will be described with reference to FIG. 7. FIG. 7 is a schematic diagram showing an example for illustrating an exemplary layout model after paragraph division according to an exemplary embodiment of the present disclosure, wherein paragraph division is performed on character data in a layout model 701. In FIG. 7, the character data is represented by "1", and blank data that may be present is not illustrated.

In step S601, a current scan line, for example, a first scan line shown in FIG. 7, is read. In step S603, it is determined whether there is character data in the current scan line. If there is character data in the current scan line ("YES" in step S603), the process proceeds to step S605; otherwise ("NO" in step S603), it is determined whether there is a next scan line (step S613). If it is determined, in step S613, that there is a next scan line ("YES" in step S613), the next scan line is used as the current scan line, and the processing from step S601 is continued. If it is determined, in step S613, that there is no next scan line ("NO" in step S613), it is determined that the scanning of the layout model is ended. Since there are sequences of continuous character data (i.e., "character data sequence") STDS1 and STDS2 in the first scan line in FIG. 7, it is determined that there is character data, and the process proceeds to step S605.

In step 605, for a current character data sequence in a current scan line (e.g., the character data sequence STDS1 in the first scan line in FIG. 7), it is determined whether there is a character data sequence in an adjacent previous scan line that has an overlap rate greater than a threshold overlap rate with a character data sequence in the current scan line in a horizontal direction (rule (a)). If so ("YES" in step S605), the character data sequence in the current scan line is divided into a paragraph to which the character data sequence of the adjacent previous scan line belongs (step S609); and if not ("NO" in step S605), it is determined that the character data sequence in the current scan line belongs to a new paragraph (step S607).

In particular, if it is determined, in step S605, that there is no character data sequence in the adjacent previous scan line that has an overlap rate greater than a threshold overlap rate with the character data sequence in the current scan line, it is equivalent to determine (1) that there is no character data sequence in the adjacent previous scan line at all, or (2) that there is a character data sequence in the adjacent previous scan line, but the overlap rate between the data sequence in the adjacent previous scan line and the current character data sequence in the current scan line is not greater than the threshold overlap rate. The case (1) means that if the adjacent previous scan line is a blank scan line without character data, thus the current character data sequence in the current scan line is likely to represent the start character data in a new paragraph; and the case (2) means that although there is character data in the adjacent previous scan line, the character data sequence has little overlap with the current character data sequence in the horizontal direction, and therefore, the current character data sequence may not belong to the paragraph to which the character data sequence in the previous scan line belongs, but belong to a new paragraph (e.g., another paragraph or another column) more likely. In the present disclosure, the overlap between two character data sequences in the horizontal direction means that there is a common portion in the projections of the two character data sequences on a coordinate axis in a horizontal direction.

Figure 8:
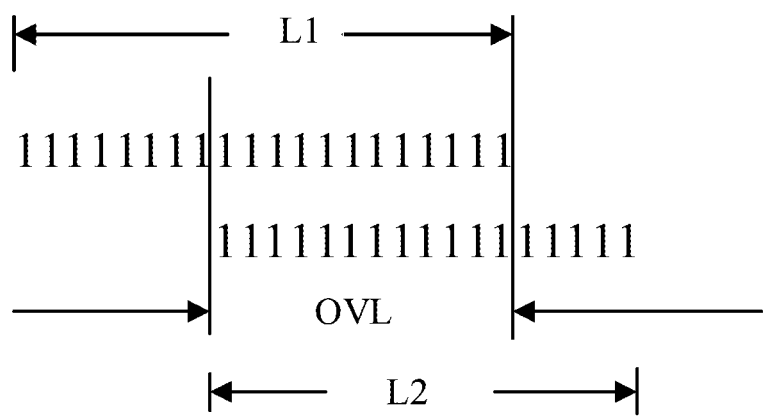
FIG. 8 is a schematic diagram showing the calculation of an overlap rate between two character data sequences according to an exemplary embodiment of the present disclosure.

According to some embodiments, the overlap rate between the two character data sequences may be defined as OVR=max (OVL/L1, OVL/L2), wherein max represents a larger number in the bracket, OVL represents the length of overlap between the two character data sequences in a horizontal direction (e.g., the number of character data or the number of pixels), and L1 and L2 represent the lengths of the two character data sequences (e.g., the number of character data or the number of pixels), respectively. FIG. 8 is a schematic diagram showing the calculation of an overlap rate between two character data sequences. In the example of FIG. 8, OVL=12, L1=20, and L2=17, and therefore, the overlap rate between the two character data sequences is OVR=max (OVL/L1, OVL/L2)=12/17. Although the concept and calculation method for the overlap rate are given herein, it should be appreciated that the concept and calculation method for the overlap rate are not limited thereto as long as they can express the overlap state of two columns in the horizontal direction.

The threshold overlap rate may be arbitrarily predetermined according to specific application requirements. According to some embodiments, the threshold overlap rate may be set to any value from 0.5 to 0.8, for example.

After it is determined, in steps S607 and S609, that the current scan line is divided into the paragraph to which the character data sequence in the adjacent previous scan line belongs or into a new paragraph, it is determined, in step S611, whether there is still a next character data sequence in the current scan line. If there is still a next character data sequence in the current scan line ("YES" in step S611), the process proceeds to step S605 to continue processing the next character data sequence in the current scan line. If there is no next character data sequence in the current scan line ("NO" in step S611), it means that the all of the character data sequences in the current scan line have been processed, and the process proceeds to step S613 to determine whether there is still a next scan line.

For the example of FIG. 7, since there is no adjacent previous scan line in the first scan line, it is determined that the character data sequence STDS1 belongs to a new paragraph P1. Since there is a next character data sequence STDS2 in the first scan line in addition to the character data sequence STDS1, the character data sequence STDS2 continues to be processed, and similarly, it is determined that the character data sequence STDS2 belongs to a new paragraph P2.

Since there is no next character data sequence in the first scan line following the character data sequence STDS2, a second scan line continues to be processed. Since the overlap rate between a character data sequence STDS3 in the second scan line and the character data sequence STDS1 in the adjacent previous scan line (that is, the first scan line) is 1, which is greater than the threshold overlap rate (e.g., 0.75), the character data sequence STDS3 is divided into the paragraph P1 to which the character data sequence STDS1 belongs. Similarly, a character data sequence STDS4 is divided into the paragraph P2 to which the character data sequence STDS2 belongs, and a character data sequence STDS5 is divided into the paragraph P1 to which the character data sequence STDS3 belongs.

Although there is a character data sequence STDS5 in an adjacent previous scan line (that is, a third scan line) for a character data sequence STDS6 in a fourth scan line, the overlap rate between the two character data sequences is 0, and therefore, the character data sequence STDS6 is divided into a new paragraph P3.

There is no character data sequence in an adjacent previous scan line (that is, a fifth scan line) for a character data sequence STDS7 in a sixth scan line, the character data sequence STDS7 is divided into a new paragraph P4. A character data sequence STDS8 in a seventh scan line is also divided into the paragraph P4 because the overlap rate between the character data sequence STDS8 and the character data sequence STDS7 is greater than the threshold overlap rate.

As described above, according to the exemplary scanning method in the flow chart of FIG. 6, the layout model in the example of FIG. 7 is divided into paragraphs P1 to P4.

According to some embodiments, the character data may include data representing the height of a character line. The data representing the height of a character line may be normalized, for example, based on a preset height (for example, but not limited to, a fraction of an average character height, such as one tenth), and may be rounded (e.g., rounded off or rounded up, etc.). For example, the preset height may be set to one pixel, and character data of a character line having a character line height of 10 pixels may be set to 10. According to such an embodiment, a determination rule (rule (b)) may be added in step S605: that is, if the difference between the value of character data of a character data sequence in a current scan line and the value of character data of a character data sequence in an adjacent previous scan line is greater than a threshold height difference, it is determined that the character data sequence in the current scan line belongs to a new paragraph. In other words, in step S605, such a condition that "the difference between the value of character data of the character data sequence in the current scan line and the value of character data of the character data sequence in the adjacent previous scan line is not greater than a threshold height difference" may be taken as a necessary condition for dividing the character data sequence in the current scan line into the paragraph to which the character data sequence in the adjacent previous scan line belongs. The threshold height difference may be a preset number of pixels, e.g., 3 pixels or 5 pixels, etc., or may be a ratio, e.g., a fraction of the height of a smaller character line in comparison objects, etc.

According to some embodiments, a determination rule (rule (c)) may be added in step S605: that is, if the overlap rates between the character data sequence in the current scan line and a plurality of character data sequences in the adjacent previous scan line in the horizontal direction are all greater than a threshold overlap rate, it is determined that the character data sequence in the current scan line belongs to a new paragraph.

Figure 9A:
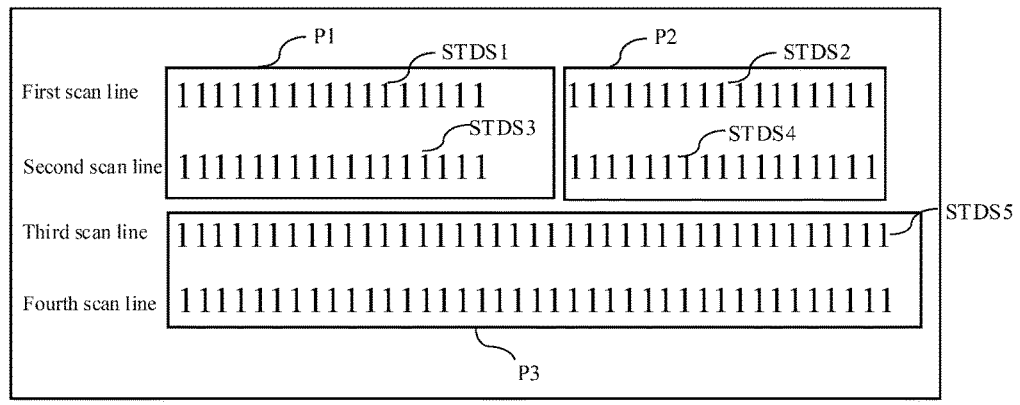
FIGS. 9A and 9B are schematic diagrams showing examples for illustrating the exemplary layout model for paragraph division according to an exemplary embodiment of the present disclosure.

FIG. 9A is a schematic diagram showing an example for illustrating the exemplary layout model for paragraph division according to an exemplary embodiment of the present disclosure, which shows that the character data sequences STDS1 and STDS3 are divided into the paragraph P1, and the character data sequences STDS2 and STDS4 are divided into the paragraph P2. For the character data sequence STDS5 in the third scan line, although there are character data sequences STDS3 and STDS4 in the adjacent previous scan line (that is, the second scan line) which have overlap rates greater than the threshold overlap rate with the character data sequence STDS5, if the rule (c) is considered, the character data sequence STDS5 is divided into a new paragraph P3 under the combined action of the rules (a) and (c) because the overlap rates in the horizontal direction between the character data sequence STDS5 and the plurality of character data sequences STDS3 and STDS4 in the second scan line are all greater than the threshold overlap rate.

According to some embodiments, a determination rule (rule (d)) may be added in step S605: i.e., if there are a plurality of character data sequences in a current scan line that all have an overlap rates greater than a threshold overlap rate with the same character data sequence in the adjacent previous scan line in a horizontal direction, it is determined that the plurality of character data sequences in the current scan line respectively belong to corresponding new paragraphs.

Figure 9B:
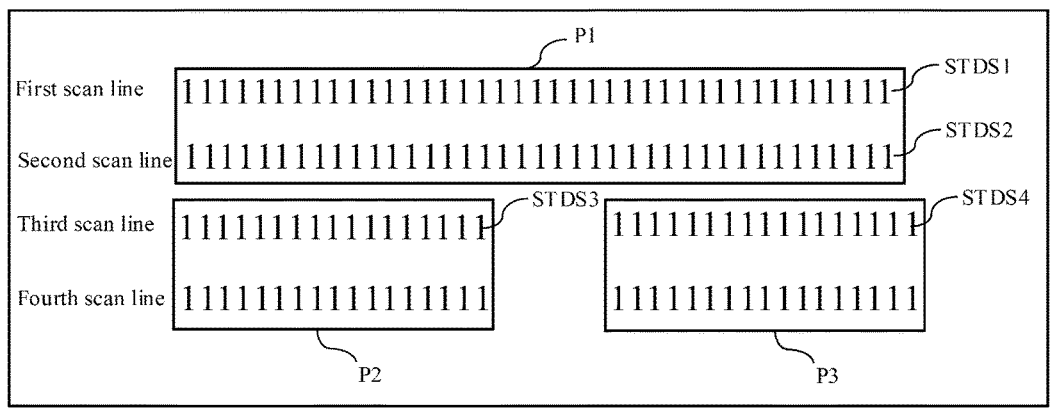

FIG. 9B is a schematic diagram showing an example for illustrating the exemplary layout model for paragraph division according to an exemplary embodiment of the present disclosure, which shows that the character data sequences STDS1 and STDS2 are divided into the paragraph P1. For the character data sequences STDS3 and STDS4 in the current scan line, i.e., the third scan line, although there is the character data sequence STDS2 in the adjacent previous scan line thereof, i.e., the second scan line, having an overlap rate greater than the threshold overlap rate with the character data sequences STDS3 and STDS4, if the rule (d) is considered, the character data sequences STDS3 and STDS4 are respectively divided into corresponding new paragraphs P2 and P3 under the combined action of the rules (a) and (d) because the overlap rates between the plurality of character data sequences STDS3 and STDS4 in the third scan line and the character data sequence STDS2 in the second scan line are all greater than the threshold overlap rate.

According to the rules (c) and (d), if the form of typesetting changes (for example, if one scan line embodies the typesetting of no column division but the adjacent scan line embodies the typesetting of column division), it may be considered that character data sequences in scan lines of different forms of typesetting belong to different paragraphs.

It should be noted that if any two or more of the rules (a) to (d) are used in combination, each of the rules used in combination is a sufficient condition for dividing the current character data sequence to a new paragraph, that is, if any of the rules is established, dividing the current character data sequence to a new paragraph. In other words, in the case where these rules are used in combination, the current character data sequence is divided into the paragraph to which the character data sequence in the adjacent previous scan line belongs only if all of the rules used in combination are not satisfied. Through any one or more of the rules (b) to (d), the characters that are close to each other but actually belong to different paragraphs in some application scenarios may be distinguished.

According to some embodiments, when it is determined, in step S607, a character data sequence in the current scan line belongs to a new paragraph, coordinate information of the character data sequence in the current scan line may be set as coordinate information of the new paragraph. The "coordinate information of a paragraph" is, for example, coordinate information of a minimum rectangle capable of including all the character data sequences in the paragraph, which may be, for example, represented by upper left coordinate (X1, Y1), upper right coordinate (X2, Y1), lower left coordinate (X1, Y2) and lower right coordinate (X2, Y2). For example, it may be assumed the rightwards X coordinate axis as a positive direction, and the downwards Y coordinate axis as the positive direction. However, the method of the present disclosure may also be implemented using coordinate systems in other directions, as long as the positive and negative signs of the coordinates are correspondingly adjusted according to the directions of the coordinate axis. If it is determined that the current character data sequence belongs to a new paragraph, the new paragraph currently includes only the current character data sequence, with the upper left coordinate of the new paragraph overlapping with the lower left coordinate, and the upper right coordinate thereof overlapping with the lower right coordinate. If start point (e.g., left) coordinate and end point (e.g., right) coordinate of the current character data sequence are respectively, for example, (CX1, CY1) and (CX2, CY1), coordinate information of the new paragraph is: upper left coordinate (CX1, CY1), upper right coordinate (CX2, CY1), lower left coordinate (CX1, CY1), and lower right coordinate (CX2, CY1).

According to some embodiments, when it is determined, in step S609, that the character data sequence in the current scan line is divided into the paragraph to which the character data sequence in the adjacent previous scan line belongs, current coordinate information of the paragraph may be updated based on coordinate information of a minimum rectangle capable of including both the current paragraph and the character data sequence in the current scan line. According to some embodiments, it is assumed that the current paragraph has upper left coordinate (X1, Y1), upper right coordinate (X2, Y1), lower left coordinate (X1, Y2), and lower right coordinate (X2, Y2), and the current character data sequence has a start point coordinate (CX1, CY1) and an end point coordinate (CX2, CY1), the coordinate information of the paragraph updated with the current character data sequence included should be: upper left coordinates (min(X1, CX1), Y1), upper right coordinates (max (X2, CX2), Y1), lower left coordinates (min (X1, CX1), CY1), and lower right coordinates (max(X2, CX2), CY1), where min represents that the minimum value is taken and max represents that the maximum value is taken.

Figure 10:
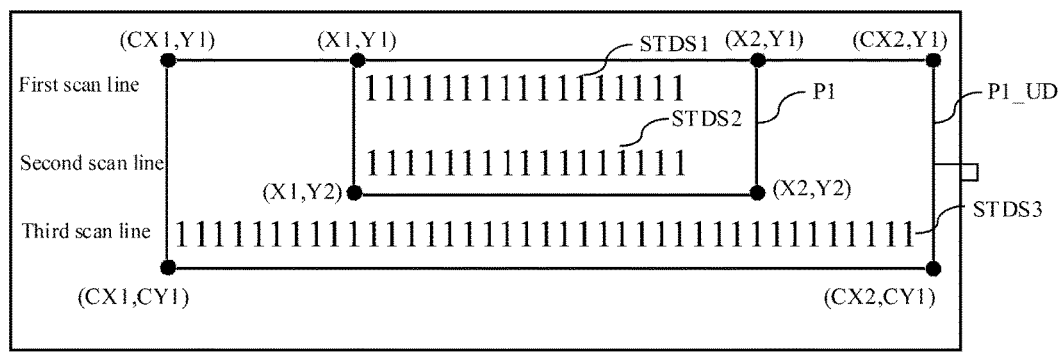
FIG. 10 is a schematic diagram for illustrating the update processing of paragraph coordinate information according to an exemplary embodiment of the present disclosure.

FIG. 10 is a schematic diagram showing an example for illustrating an exemplary layout model for update processing of paragraph coordinate information according to an exemplary embodiment of the present disclosure. In the example of FIG. 10, it is determined that the character data sequence STDS3 (the current character data sequence) in the third scan line (the current scan line) is divided into the paragraph P1 (the current paragraph) to which the character data sequence STDS2 in the second scan line (the adjacent previous scan line) belongs. In this case, since the paragraph P1 newly includes the character data sequence STDS3, the coordinates of the paragraph P1 may be updated according to the coordinates of the character data sequence STDS3 in the above manner. More specifically, the current coordinate information of the paragraph P1 may be updated to coordinate information of a minimum rectangle (i.e., a rectangle P1_UD) capable of including both the current paragraph P1 and the character data sequence STDS3 in the current scan line. Since CX1<X1 and CX2>X2 in this example, the updated paragraph P1 (i.e., the rectangle P1_UD) has the following coordinate information: upper left coordinates (CX1, Y1), upper right coordinates (CX2, Y1), lower left coordinates (CX1, CY1), and lower right coordinates (CX2, CY1).

According to some embodiments, instead of generating or updating the coordinates of a paragraph each time a character data sequence is divided into a paragraph as in the above, coordinate information is generated for each paragraph after all the character data sequences in the layout model are divided into corresponding paragraphs. In this case, the coordinate information of a minimum rectangle capable of including all the character data sequences in one paragraph is taken as the coordinate information of the paragraph. If all the character data sequences in the paragraph have a start point coordinate (CX1i, CY1i) and an end point coordinate (CX2i, CY1i), where i represents an i-th character data sequence in the paragraph, the paragraph may have the following coordinate information: upper left coordinate (min(CX1i), min(CY1i)), upper right coordinate (max(CX2i), min(CY1i)), lower left coordinate (min(CX1i), max(CY1i)), and lower right coordinate (max(CX2i), max (CY1i)).

According to the exemplary method in the flow chart of FIG. 6, paragraph division of the layout model may be obtained when the scanning of the layout model is ended, such that the algorithm is simple and the calculation amount is small.

Although not shown in the drawings, the method of the present disclosure may further include: mapping coordinate information of each paragraph obtained by paragraph division on the layout model to an image after finishing the paragraph division on the layout model, so as to obtain the paragraph division in the image. When the size of the layout model is the same to the size of the image, the coordinate information of the paragraphs in the image coincides with the coordinate information of the paragraphs in the layout model. When the size of the layout model is scaled compared to the size of the image, the coordinate information of the paragraphs in the image is also inversely scaled relative to the coordinate information of the paragraphs in the layout model.

The exemplary method for layout analysis according to the present disclosure has been described above with reference to the accompanying drawings. After the layout analysis, subsequent processing may also be performed. For example, the text characters recognized paragraph by paragraph may be converted into sound data according to a result of paragraph division in combination with a result of character recognition, which may be used, for example, in applications related to audio reading materials and visual impaired assisting applications.

Figure 11:
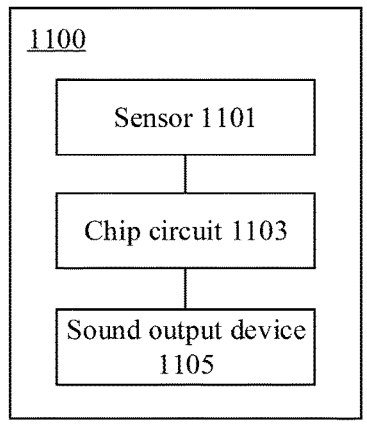
FIG. 11 is a structural block diagram showing a reading assisting device according to an exemplary embodiment of the present disclosure.

An aspect of the present disclosure may include a reading assisting device. FIG. 11 is a structural block diagram showing a reading assisting device according to an exemplary embodiment of the present disclosure. As shown in FIG. 11, the reading assisting device 1100 includes: a sensor 1101 (which may be, for example, implemented as a camera and a photographing device) configured to acquire the aforementioned image (the image may be, for example, a static image or a video image, and the image may include characters): and a chip circuit 1103, the chip circuit including a circuit configured to execute the steps of any of methods above. The chip circuit may further include a circuit configured to perform character recognition on the image to obtain text characters, and a circuit configured to convert the text characters in each paragraph into sound data according to a result of paragraph division. The circuit configured to perform character recognition on the image to obtain text characters may, for example, use any character recognition (e.g., optical character recognition (OCR)) software or circuit. The circuit configured to convert the text characters in each paragraph into sound data according to a result of paragraph division may, for example, use any character-to-speech conversion software or circuit. The circuits may be implemented, for example, by an ASIC chip or an FPGA chip. The reading assisting device 1100 may further include a sound output device 1105 (e.g., a speaker, a headphone, etc.) configured to output the sound data (i.e., speech data).

An aspect of the present disclosure may include an electronic device. The electronic device may include: a processor; and a memory for storing a program, the program including instructions that, when executed by the processor, cause the processor to execute any of the methods. According to some embodiments, the program may further include an instruction to convert, when the instruction is executed by the processor, the text characters in each paragraph into sound data according to a result of paragraph division. According to some embodiments, the electronic device may be, for example, a reading assisting device. According to some embodiments, the electronic device may be another device (e.g., a mobile phone, a computer, a server, etc.) in communication with the reading assisting device. In the case where the electronic device is another device in communication with the reading assisting device, the reading assisting device may send the photographed image to the another device for execution of any of the methods by the another device, and then returns a processing result (e.g., a layout analysis result, a character recognition result, and/or sound data converted from the text characters, etc.) of the method back to the reading assisting device for execution of the subsequent processing (e.g., playing the sound data to a user) by the reading assisting device.

According to some embodiments, the reading assisting device may be implemented as a wearable device, for example, a device worn in the form of eyeglasses, a head-mounted device (such as a helmet or a hat), a device wearable on ears, accessories attached to eyeglasses (e.g., an eyeglass frame, eyeglass legs, etc.), accessories attached to the hat, etc.

By means of the reading assisting device, a visual impaired user is able to "read", as a normal vision reader, conventional reading materials (e.g., books, magazines, etc.) using a similar reading posture. During the course of "reading", the reading assisting device automatically performs paragraph division on the captured layout image according to the methods in the foregoing embodiments, sequentially converts the character in the paragraphs into sound in an order with the divided paragraph, and outputs the sound through an output apparatus, such as a speaker or a headphone, for the user to listen.

An aspect of the present disclosure may include a non-transitory computer readable storage medium storing a program, the program including instructions that, when executed by a processor of an electronic device, cause the electronic device to execute any of the methods.

Figure 12:
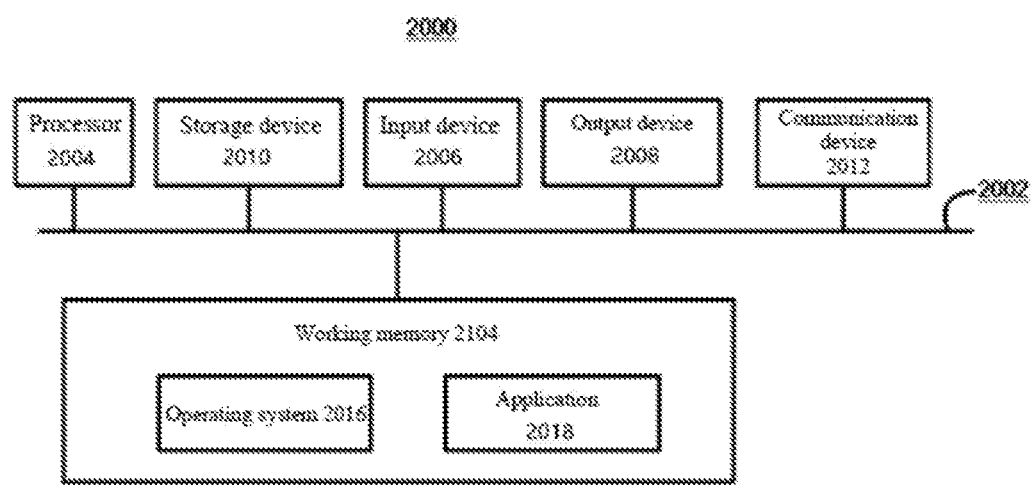
FIG. 12 is a structural block diagram showing an exemplary computing device that can be applied to the exemplary embodiments.

Referring to FIG. 12, a computing device 2000 is now described, which is an example of a hardware device that can be applied to various aspects of the present disclosure. The computing device 2000 may be any machine configured to perform processing and/or computing, which may be, but is not limited to, a workstation, a server, a desktop computer, a laptop computer, a tablet computer, a personal digital assistant, a smart phone, an on-board computer, a wearable device or any combination thereof. According to some embodiments, the reading assisting device or the electronic device may also be implemented, in whole or at least in part, by the computing device 2000 or a similar device or system.

The computing device 2000 may include elements in connection with a bus 2002 or in communication with a bus 2002 (possibly via one or more interfaces). For example, the computing device 2000 may include the bus 2002, one or more processors 2004 (which may be used to implement the processor or chip circuit included in the reading assisting device), one or more input devices 2006, and one or more output devices 2008. The one or more processors 2004 may be any type of processors, and may include, but are not limited to, one or more general-purpose processors and/or one or more dedicated processors (e.g., special processing chips). The input device 2006 may be any type of device capable of inputting information to the computing device 2000, and may include, but is not limited to, a sensor (e.g., the sensor for acquiring an image as described above), a mouse, a keyboard, a touch screen, a microphone and/or a remote controller. The output device 2008 may be any type of device capable of presenting information, and may include, but is not limited to, a display, a speaker (e.g., the output device that may be used to output the sound data as described above), a video/audio output terminal, a vibrator and/or a printer. The computing device 2000 may also include a non-transitory storage device 2010 or be connected to a non-transitory storage device 2010. The non-transitory storage device (which may be, for example, used for implementing the non-transitory computer readable storage medium as described above) may be non-transitory and may be any storage device capable of implementing data storage, and may include, but is not limited to, a disk drive, an optical storage device, a solid-state memory, a floppy disk, a flexible disk, a hard disk, a magnetic tape, or any other magnetic medium, an optical disk or any other optical medium, a read-only memory (ROM), a random access memory (RAM), a cache memory and/or any other memory chip or cartridge, and/or any other non-transitory medium from which a computer can read data, instructions and/or codes. The non-transitory storage device 2010 may be detached from an interface. The non-transitory storage device 2010 may have data/programs (including instructions)/codes for implementing the methods and steps. The computing device 2000 may also include a communication device 2012. The communication device 2012 may be any type of device or system that enables communication with an external device and/or a network, and may include, but is not limited to, a modem, a network card, an infrared communication device, a wireless communication device and/or a chipset, e.g., a Bluetooth device, a 1302.11 device, a WiFi device, a WiMax device, a cellular communication device and/or the like.

The computing device 2000 may also include a working memory 2014 (which may be used to implement the memory included in the reading assisting device), which may be any type of working memory capable of storing programs (including instructions) and/or data useful to the working of the processor 2004, and may include, but is not limited to, a random access memory and/or a read-only memory.

Software elements (programs) may be located in the working memory 2014, and may include, but is not limited to, an operating system 2016, one or more applications 2018, drivers, and/or other data and codes. The instructions for executing the methods and steps may be included in the one or more applications 2018. Executable codes or source codes of the instructions of the software elements (programs) may be stored in a non-transitory computer readable storage medium (e.g., the storage device 2010), and may be stored in the working memory 2014 when executed (may be compiled and/or installed). The executable codes or source codes of the instructions of the software elements (programs) may also be downloaded from a remote location.

When the computing device 2000 shown in FIG. 12 is applied to an embodiment of the present disclosure, the memory 2014 may store program codes for executing the flow chart of the present disclosure and/or an image to be recognized containing character content. The applications 2018 may include optical character recognition applications (such as Adobe), voice conversion applications, editable character processing applications, etc., that are provided by a third party. The input device 2006 may be a sensor for acquiring an image including character content. The stored image including character content or the acquired image may be processed by the OCR application into an output result including characters. The output device 2008 is, for example, a speaker or a headphone for speech broadcast. The processor 2004 is configured to execute, according to the program codes in the memory 2014, the steps of the methods according to various aspects of the present disclosure.

It should also be appreciated that various variations may be made according to specific requirements. For example, custom hardware may also be used, and/or specific elements (i.e., the chip circuits) may be implemented in hardware, software, firmware, middleware, microcodes, hardware description languages, or any combination thereof. For example, some or all of the disclosed methods and devices (e.g., the circuits in the chip circuit) may be implemented by programming hardware (e.g., a programmable logic circuit including a field programmable gate array (FPGA) and/or a programmable logic array (PLA)) in an assembly language or a hardware programming language (such as, VERILOG, VHDL, C++) by using the logic and algorithm in consistent with the present disclosure.

It should also be appreciated that the components of the computing device 2000 may be distributed over a network. For example, some processing may be executed by one processor while other processing may be executed by another processor away from the one processor. Other components of the computing system 2000 may also be similarly distributed. In this way, the computing device 2000 may be interpreted as a distributed computing system that performs processing at multiple positions.

Although the embodiments or examples of the present disclosure have been described with reference to the accompanying drawings, it should be appreciated that the methods, systems and devices described above are merely exemplary embodiments or examples, and the scope of the present disclosure is not limited by the embodiments or examples, but only defined by the appended authorized claims and equivalent scopes thereof. Various elements in the embodiments or examples may be omitted or substituted by equivalent elements thereof. Moreover, the steps may be executed in an order different from that described in the present disclosure. Further, various elements in the embodiments or examples may be combined in various ways. It is important that, as the technology evolves, many elements described herein may be replaced with equivalent elements that appear after the present disclosure.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented layout analysis method, comprising the following steps executed by a processor:
    obtaining coordinate information of one or more text character lines in an image containing a text content;
    generating a layout model corresponding to the image by setting character data in regions in a data structure, the regions corresponding to the coordinate information of the one or more text character lines, the character data including data indicating presence of a text character;
    scanning the generated layout model to obtain the character data from the layout model;
    performing paragraph division on the layout model based on a relative positional relationship among the obtained character data in the layout model;
    performing character recognition on the image to obtain text characters; and
    converting the text characters in each paragraph into sound data according to a result of paragraph division.

2. The layout analysis method according to claim 1, wherein the regions that correspond to the coordinate information of the one or more character lines comprise a region determined from the coordinate information of each character line, and a region obtained by extending by a specific distance in a vertical direction from the coordinate information of the character line.

3. The layout analysis method according to claim 1, wherein the performing paragraph division on the layout model comprises: if there is no character data sequence in an adjacent previous scan line that has an overlap rate greater than a threshold overlap rate with a character data sequence in a current scan line in a horizontal direction, determining that the character data sequence in the current scan line belongs to a new paragraph.

4. The layout analysis method according to claim 3, wherein the determining that the character data sequence in the current scan line belongs to a new paragraph comprises: setting the coordinate information of the character data sequence in the current scan line as coordinate information of the new paragraph.

5. The layout analysis method according to claim 1,
    wherein the character data includes data representing a height of the character line, and
    wherein the performing paragraph division on the layout model comprises: if the difference between a value of character data of a character data sequence in a current scan line and a value of character data of a character data sequence in an adjacent previous scan line is greater than a threshold height difference, determining that the character data sequence in the current scan line belongs to a new paragraph.

6. The layout analysis method according to claim 1, wherein the performing paragraph division on the layout model comprises: if the overlap rates between a character data sequence in a current scan line and a plurality of character data sequences in an adjacent previous scan line in a horizontal direction are all greater than a threshold overlap rate, determining that the character data sequence in the current scan line belongs to a new paragraph.

7. The layout analysis method according to claim 1, wherein the performing paragraph division on the layout model comprises: if there are a plurality of character data sequences in a current scan line that all have an overlap rate greater than a threshold overlap rate with the same character data sequence in an adjacent previous scan line in a horizontal direction, determining that the plurality of character data sequences in the current scan line belong to corresponding new paragraphs respectively.

8. The layout analysis method according to claim 1, wherein during the performing of paragraph division on the layout model, a necessary condition for dividing a character data sequence in a current scan line into the paragraph to which a character data sequence in an adjacent previous scan line belongs comprises: the overlap rate between the character data sequence in the current scan line and the character data sequence in the adjacent previous scan line in a horizontal direction being greater than a threshold overlap rate.

9. The layout analysis method according to claim 1,
wherein the character data includes data representing a height of the character line, and
wherein during the performing of paragraph division on the layout model, a necessary condition for dividing a character data sequence in a current scan line into the paragraph to which a character data sequence in an adjacent previous scan line belongs comprises: a difference between a value of character data of the character data sequence in the current scan line and a value of character data of the character data sequence in the adjacent previous scan line being not greater than a threshold height difference.

10. A reading assisting device, comprising:
a sensor configured to acquire an image containing a text content;
an integrated circuit comprising:
a first circuit unit configured to execute the following steps:
obtaining coordinate information of one or more text character lines in the image;
generating a layout model corresponding to the image by setting character data in regions in a data structure, the regions corresponding to the coordinate information of the one or more character lines, the character data including data indicating presence of a text character; d
scanning the generated layout model to obtain the character data from the layout model; and
performing paragraph division on the layout model based on a relative positional relationship among the obtained character data in the layout model;
a second circuit unit configured to perform text character recognition on the image to obtain text characters; and
a third circuit unit configured to convert the text characters in each paragraph one by one into sound data according to a paragraph division result; and
a sound output device configured to output the sound data.

11. The reading assisting device according to claim 10, wherein the regions that correspond to the coordinate information of the one or more character lines comprise a region determined from the coordinate information of each character line, and a region obtained by extending by a specific distance in a vertical direction from the coordinate information of the character line.

12. The reading assisting device according to claim 10, wherein the performing paragraph division on the layout model comprises: if there is no character data sequence in an adjacent previous scan line that has an overlap rate greater than a threshold overlap rate with a character data sequence in a current scan line in a horizontal direction, determining that the character data sequence in the current scan line belongs to a new paragraph.

13. The reading assisting device according to claim 10,
wherein the character data includes data representing a height of the character line, and
wherein the performing paragraph division on the layout model comprises: if the difference between a value of character data of a character data sequence in a current scan line and a value of character data of a character data sequence in an adjacent previous scan line is greater than a threshold height difference, determining that the character data sequence in the current scan line belongs to a new paragraph.

14. The reading assisting device according to claim 10, wherein the performing paragraph division on the layout model comprises: if the overlap rates between a character data sequence in a current scan line and a plurality of character data sequences in an adjacent previous scan line in a horizontal direction are all greater than a threshold overlap rate, determining that the character data sequence in the current scan line belongs to a new paragraph.

15. The reading assisting device according to claim 10, wherein the performing paragraph division on the layout model comprises: if there are a plurality of character data sequences in a current scan line that all have an overlap rate greater than a threshold overlap rate with the same character data sequence in an adjacent previous scan line in a horizontal direction, determining that the plurality of character data sequences in the current scan line belong to corresponding new paragraphs respectively.

16. The reading assisting device according to claim 10, wherein the determining that the character data sequence in the current scan line belongs to a new paragraph comprises: setting the coordinate information of the character data sequence in the current scan line as coordinate information of the new paragraph.

17. A non-transitory computer readable storage medium storing executable instructions that, when executed by a processor of an electronic device, cause the electronic device to execute the following steps:
obtaining coordinate information of one or more text character lines in an image containing a text content;
generating a layout model corresponding to the image by setting character data in regions in a data structure, the regions corresponding to the coordinate information of the one or more text character lines, the character data including data indicating presence of a text character;
scanning the generated layout model to obtain the character data from the layout model; and
performing paragraph division on the layout model based on a relative positional relationship among the read character data in the layout model;
performing character recognition on the image to obtain text characters; and
converting the text characters in each paragraph into sound data one by one according to a result of paragraph division.

18. The non-transitory computer readable storage medium according to claim 17, wherein the regions that correspond to the coordinate information of the one or more character lines comprise a region determined from the coordinate information of each character line, and a region obtained by extending by a specific distance in a vertical direction from the coordinate information of the character line.

19. The non-transitory computer readable storage medium according to claim 17, wherein the performing paragraph division on the layout model comprises: if there is no character data sequence in an adjacent previous scan line that has an overlap rate greater than a threshold overlap rate with a character data sequence in a current scan line in a horizontal direction, determining that the character data sequence in the current scan line belongs to a new paragraph.

20. The non-transitory computer readable storage medium according to claim 17,
  wherein the character data includes data representing a height of the character line, and
  wherein the performing paragraph division on the layout model comprises: if the difference between a value of character data of a character data sequence in a current scan line and a value of character data of a character data sequence in an adjacent previous scan line is greater than a threshold height difference, determining that the character data sequence in the current scan line belongs to a new paragraph.

* * * * *